Sept. 15, 1970                  H. A. OMLEY                  3,528,465
                         SAW WITH CERAMIC CUTTING BODIES
Filed June 1, 1965                                      2 Sheets-Sheet 1
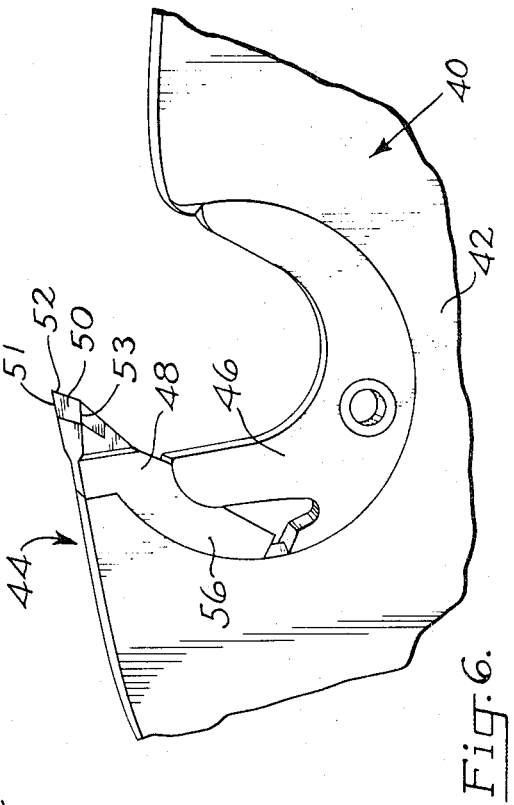
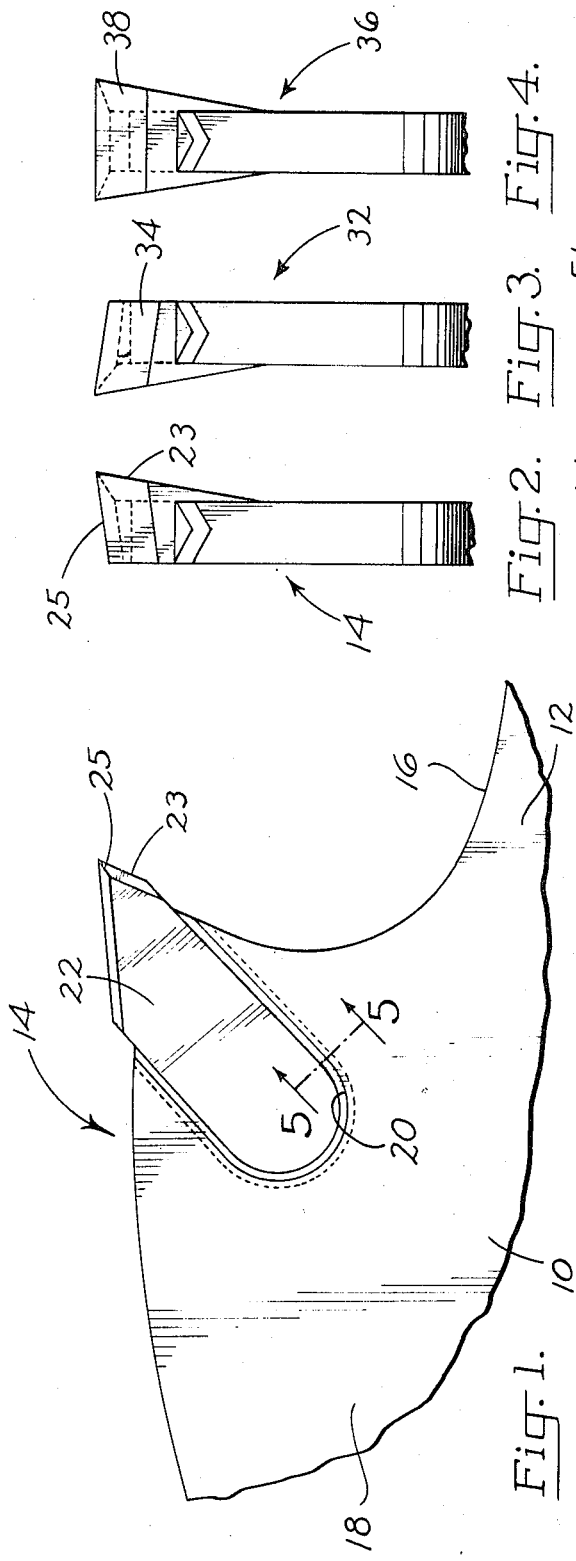
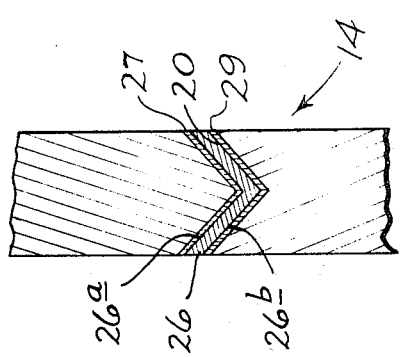
Herbert A. Omley
INVENTOR
BY Kolisch & Hartwell
Attys.

Sept. 15, 1970  H. A. OMLEY  3,528,465
SAW WITH CERAMIC CUTTING BODIES
Filed June 1, 1965  2 Sheets-Sheet 2
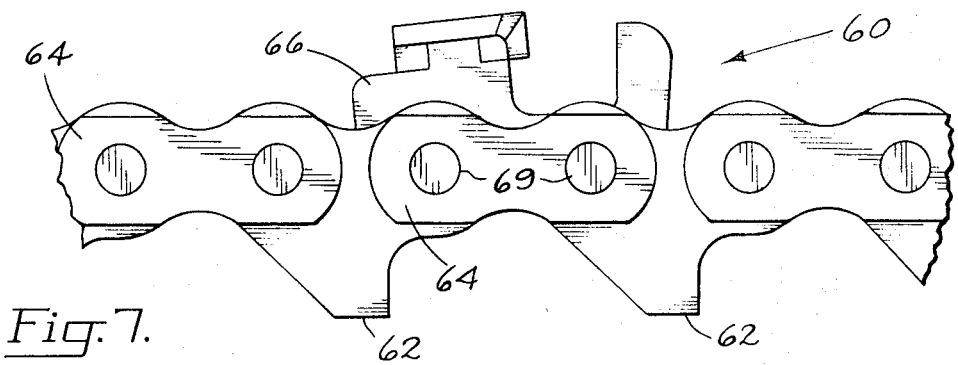
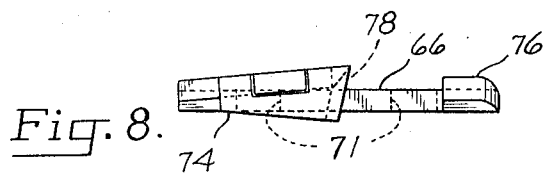
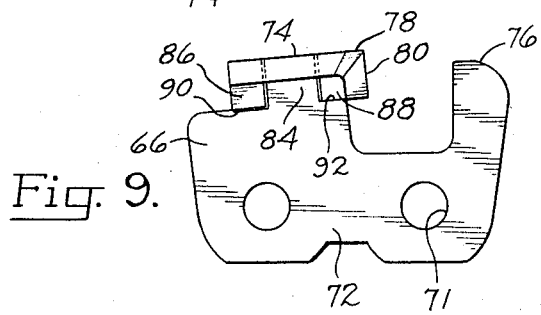
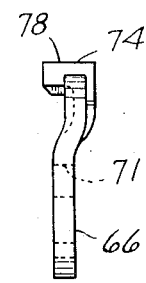
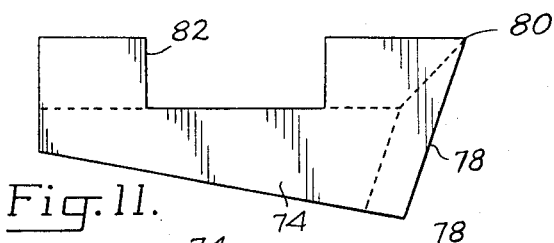
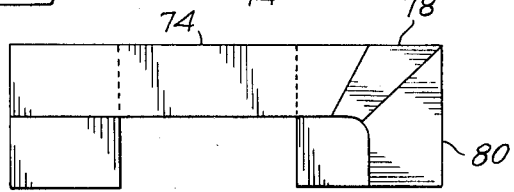
Herbert A. Omley
INVENTOR
BY Kolisch & Hartwell
Attys United States Patent Office 3,528,465
Patented Sept. 15, 1970

3,528,465
SAW WITH CERAMIC CUTTING BODIES
Herbert A. Omley, Rte. 1, Box 627,
Dallas, Oreg. 97338
Filed June 1, 1965, Ser. No. 460,365
Int. Cl. B27b 33/08, 33/12
U.S. Cl. 143—145
2 Claims

ABSTRACT OF THE DISCLOSURE

A saw including a ceramic body as the cutting element in the saw, such body being bonded to a metallic mounting and the mounting being secured in place on the saw.

---

This invention relates to saws in general, and more particularly to saws featuring bodies of integrated ceramic composition having edges that function as the cutting edges of cutting elements in the saw.

With saws including circular saws, band saws, chain saws, etc., the dulling of cutter elements or teeth obviously is disadvantageous as it renders the saw less efficient in performing its cutting. To sharpen repeatedly the teeth of a saw requires the expenditure of time and money. Allowances made in the shape of a tooth to permit repeated sharpening introduces a power loss when the saw is used. A wide tooth necessary for resharpening results in a wide kerf, and a wide kerf is uneconomic in a saw mill. Dull teeth do not produce as smooth cuts as do sharp teeth.

To minimize such difficulties, some have proposed a special steel composition for the cutting elements or teeth, rendering them more resistant to dulling. Inserts of material such as tungsten carbide have also been employed for tips. Dulling, however, still remains a problem, particularly when high temperatures are developed in a saw.

In general terms, this invention contemplates, as an object thereof, the provision of a saw which includes as cutting elements bodies of integrated ceramic composition having at least one cutting edge extending along margins thereof. The ceramic material selected for the cutting bodies is one having a high alumina content, preferably a content exceeding 95% alumina. With such ceramic materials, relatively high tensile strengths are obtained in the ceramic bodies, whereby they are resistant to shear stresses. Further, relatively high coefficients of thermal conductivity are obtained, promoting more rapid dissipation of heat. Ceramic has a wear resistance surpassing to a considerable extent the wear resistance of conventional materials such as special steels, etc. Ceramic materials are obtainable at relatively low cost. The ceramic bodies are extremely hard and are sharpenable, and these characteristics together with the strength, conductivity and other features mentioned render cutting bodies produced from the material and mounted on a saw a distinct improvement over prior-known structures.

In a saw having ceramic bodies thereon providing the cutting edges, problems are presented as to the manner in which a ceramic body is attached to the metallic body structure of the saw, whether it be a saw blade or a metallic link in a saw chain. In general, to clamp or otherwise hold by mechanical means a ceramic body to a metal part yields a construction that is cumbersome and impractical. The usual type of soldering or brazing operation fails to produce a bond between a ceramic body and a metallic part of the type that can withstand the rigors of sawing. Another object, therefore, is to provide an improved saw featuring novel means attaching ceramic cutting bodies with metallic body structure in the saw.

More specifically, an object of this invention is to provide a novel saw with ceramic cutting bodies forming part of the saw, where each ceramic body is secured to saw body structure through a metallic mounting joined to the ceramic part in a special type of bonding operation conducted under temperature and environmental conditions whereby a strong and lasting bond is produced. The mounting is attached to the saw body structure either by mechanical means, or as contemplated in a preferred embodiment, by a more conventional type of bond performed at a lower temperature than the one employed during bonding of the ceramic to the metallic mounting.

A further object is to provide a method of manufacturing a saw, having ceramic bodies functioning as portions of cutting elements therein, which method comprises the step of first bonding the ceramic bodies to metallic mountings under special environmental and temperature conditions, and then mounting the ceramic bodies through their mountings on the body structure of the saw.

Various other features and novel objects of the invention will become apparent as the following description is read in conjunction with the accompanying drawings, wherein:

FIG. 1 is a side view, somewhat enlarged, of portions of a circular saw, including a tooth in the saw having a ceramic body with edges forming cutting edges in the tooth according to one embodiment of the invention;

FIG. 2 is a view of the front of tooth;

FIGS. 3 and 4 illustrate modified forms of saw teeth;

FIG. 5 is a cross-sectional view, taken along the line 5—5 in FIG. 1;

FIG. 6 is a perspective view illustrating another type of saw tooth;

FIG. 7 is a side elevation of portions of a saw chain embodying a modiled form of the invention;

FIGS. 8, 9 and 10 are top, side and end views, respectively, of a cutter link in the saw chain; and FIGS. 11 and 12 are enlarged views of a ceramic body forming part of the cutter link.

Referring now to the drawings, and first of all more particularly to FIGS. 1, 2 and 5, here portions of circular saw are shown at 10. The saw includes a saw blade 12, also referred to herein as saw body structure, made of the usual steel, and at 14 there is illustrated a saw tooth or cutter element in the saw.

Tooth 14 is one of multiple teeth extending in a row about the circumference of the saw. Adjacent teeth are separated from each other by gullets 16. At 18 is a heel portion in the tooth, which is of metal, and an integral part of the saw blade. Recessed into the saw blade near the front of the tooth is a recess 20 which, viewing the saw from the side, has substantially a U-shaped outline. The base of the recess has a V-shaped contour viewing a cross section of the base.

Recess 20 is employed in mounting a body 22 of integrated ceramic composition, which body has cutter edges such as those shown at 23 and 25 provided thereon which function as cutting edges for the tooth.

The ceramic employed in making body 22 is one containing a high percentage of alumina and having, because of such high alumina content, a tensile strength of 25,000 p.s.i. or more. With such tensile strength, the ceramic material has the requisite resistance to failure from shearing stress, generally considered to be a tensile stress. The high alumina content of the ceramic material also contributes to high compressive strength and renders body 22 relatively thermal conductive, the thermal conductivity of the material being approximately five times as great as more conventional ceramics.

Ceramic body 22 may be prepared by the well-known hot press process. A sintering proces may also be employed. The hot press process has some advantages, in that a product is produced which is substantially completely free of isolated pores. Such products have been noted to have tensile strengths in the range of 38,000 p.s.i. and compressive strengths of 450,000 p.s.i., characteristics which make products of this type well suited for cutting bodies in the saw.

Explaining a typical preparation, by the hot press process, a powdered mixture comprising 99% alumina (by weight) and the balance silicon dioxide, magnesium oxide, and calcium oxide, in approximately equal proportions, is introduced into a graphite die heated to a temperature of approximately 1700° C. The silicon dioxide, magnesium oxide and calcium oxide are added to bring down the firing temperatures somewhat (the melting point of pure alumina being about 2100° C.). With the powder material in the die and under pressure, the material consolidates to form a body of integrated ceramic. The edges of such a body are sharpenable to produce the cutter edges described above.

In the sintering process, the powdered material is pressed to the desired shape in a die, and after such pressing and removal from the die, the products formed are fired in a conventional ceramic kiln by heating to proper temperatures. The sintering process has the advantage of permitting the production of intricately shaped parts more easily than the hot press process first described.

In the following table, different ceramic materials are set forth exemplary of the type that are employable in forming the body 22 described. The alumina content in the ceramic material is indicated in one column, and tensile strength and compressive strength are listed in two other columns. Ceramic material B will be noted as having the highest indicated tensile strength, and this material was prepared by the hot press process described above.

TABLE I

| Sample: | Percent alumina | Tensile strength, p.s.i. | Compressive strength, p.s.i. |
| --- | --- | --- | --- |
| A | 95-97 | 28,500 | 350,000 |
| B | 99 | 38,000 | [1] 450,000 |
| C | 96 | 27,000 | 300,000 |
| D | 99 | 34,500 | 300,000 |

[1] Up to.

In securing the integrated ceramic body to saw blade 12, it has been found that a mechanical attaching means has not been satisfactory, as such tends to be bulky or introduce areas of high stressing into the body, whereby the body soon fractures and breaks. Bonding of the body directly to the metallic saw blade introduces problems, since if a satisfactory bond is to be produced, procedures are required that utilize high temperatures and a special environment such as a vacuum. As a consequence, if a direct bonding process were used, the temper in the saw blade would be affected, and the entire saw would require elaborate jigging. To produce a vacuum, an evacuatable furnace of large enough size to hold the entire saw would be required.

According to this invention, it is contemplated that the unitary ceramic body be first bonded to a metallic mounting has ben bonded in place, that the mounting be joined as by soldering or brazing to the body structure of the saw, more particularly the saw blade, the bonding of the mounting to the saw blade being done at relatively low temperatures and under atmospheric conditions.

In joining the ceramic body to a metallic mounting, an active alloy process may be employed, such as the one described in U.S. Pat. 2,570,248.

Describing such an active alloy process, first a mixture may be prepared of powdered titanium (325 mesh), a liquid vehicle such as amyl acetate, acetone, or other rapidly drying liquid, and a small amount of a binder, such as nitrocellulose lacquer, or Acryloid. The materials are mixed until a creamy consistency is obtained. The mixture then is applied to the ceramic surface area which is to be bonded in place, as by painting, or spraying the surface.

The metal mounting which is to be bonded to the ceramic is placed adjacent this painted area. Considering the form of saw tooth illustrated in FIGS. 1 through 3, the metal mounting may comprise a shim 26, having a U-shaped outline viewing the shim from the side which matches the outline of recess 20. The shim has a concave face 26a which receives the base of the ceramic body, and opposite this face a convex face 26b which fits adjacent the base of recess 20 and is bonded to the saw blade. With the shim in place and partially surrounding the ceramic body, a piece of bonding alloy such as solder or braze alloy may then be placed in proximity to where the ultimate joint between the ceramic body and shim is to be formed, and the whole assembly placed on a tray or jig, which is placed on the usual rack located within the furnace chamber of a high vacuum furnace.

The shim may be made of a low expansion alloy, such as a 42% nickel-iron alloy, which matches the coefficient of expansion of the ceramic reasonably well. The bonding alloy preferably is one having a melting point of 290° C. or higher, and typically may have one of the compositions indicated in the following table.

TABLE II

| Composition: | Melting pt. (°C.) |
| --- | --- |
| 97.5% lead, 2.5% silver | 305 |
| 97.5% lead, 1.5% silver, 1% tin | 310 |
| 90% lead, 5.0% silver, 5% indium | 290 |
| 95% lead, 5% indium | 315 |
| 95.5% lead, 2.5% silver, 2.0% tin | 300 |
| 95% lead, 5.0% silver | 305 |
| 61% silver, 24% copper, 15% indium | 625-705 |

With a solder such as the first six compositions of Table II, the furnace is heated to a temperature of about 650° C., with a pressure maintained within the furnace of the order of about $1 \times 10^{-4}$ mm. of mercury. This temperature of 650° C. is held within the furnace for about 5 minutes. During this firing time, the titanium powder remains unoxidized and protected by the high vacuum, until the temperature of the powder reaches about 500° C. At this temperature the titanium powder alloys with the solder bonding alloy (now in a molten condition), and the resulting alloy product flows over and wets the painted surface of the ceramic body, and the adjacent surface of the shim. After the 5 minute firing, the assembly is allowed to cool in the vacuum furnace to a temperature of about 150° C., at which time the assembly may be removed from the furnace. As a result of the process, a bond 27 is produced between the ceramic body and shim 26. With a brazing alloy such as the last composition in Table II, a furnace temperature of about 800° C. is employed.

Another procedure for bonding a metallic deposit to the ceramic body comprises first preparing a suspension of a liquid vehicle and a mixture of finely ground molybdenum and manganese. This material is painted on the surface area of the ceramic body where a bond is desired to prepare a coating thereover, and the painted ceramic is then fired in a hydrogen atmosphere, at a temperature of about 1600° C. A reaction takes place during the firing, between the surface of the ceramic and the coating which has been applied thereover, causing a bond to be produced between the ceramic and coating. On cooling to about 200° C., the ceramic body, together with its bonded coating, may be taken out of the furnace and the coating plated with nickel and copper in the usual manner. The metal in the plated surface, which constitutes a metal mounting, can then be soldered or brazed to the saw blade.

In bonding a ceramic body together with its metallic mounting to a saw blade, through a bond such as that shown at 29, soldering materials with lower melting points than those earlier discussed are employed. Exemplary of the soldering materials that may be used are a tin-lead solder containing 50 parts tin and 50 parts lead (having a melting point somewhat below 250° C.), a 95 parts tin and 5 parts antimony solder (having a melting point of about 232° C.), and a 95 parts tin and 5 parts silver solder (having a melting point of about 230° C.). The soldering process employed is conventional, and may comprise first heating the surfaces to be bonded together to temperatures of approximately 250° C., and with these surfaces so heated and coated with the usual flux, applying the soldering material.

It will be noted that by joining a ceramic body to a metal mounting as one step in the manufacture of the saw, and subsequently mounting the resulting product on the saw blade or body structure as another step, the necessity for employing a large vacuum furnace to receive the entire saw, or jigging an entire saw preparatory to its being placed within a furnace, is eliminated. Further, a saw blade need not be heated to a high temperature whereby its temper is affected.

In FIGS. 1, 2 and 5 a left-hand tooth is illustrated. It should be obvious that the procedures described may equally as well be used in preparing a right-hand tooth such as the one shown at 32 in FIG. 3, having ceramic body 34 presenting cutting edges in the tooth. The manufacture of the square tooth illustrated in FIG. 4 at 36, including ceramic body 38, is also possible.

FIG. 6 illustrates still another modification of the invention. In this form of the invention portions of a circular saw are shown at 40, including a saw blade 42 having a row of teeth such as tooth 44 extending about the circumference of the saw. In this form of tooth, a removable shank 46 mechanically holds a removable bit 48 on saw blade 42. Bit 48 comprises a body of integrated ceramic, shown at 50, with cutter edges such as those shown at 51, 52 and 53 functioning as cutting edges in the saw. The ceramic body is bonded to a metallic mounting portion 56 of the bit and it is this metallic mounting portion that is employed in mechanically clamping the bit to the saw blade.

In the modification of the invention illustrated in FIG. 6, bonding of ceramic body 50 to mounting portion 56 may be performed using procedures similar to those already described. In mounting the bit on a saw blade since a mechanical fastening system is contemplated, there are no high temperatures involved.

Considering now FIGS. 7 through 12, where a further modification of the invention is disclosed, portions of a saw chain are indicated at 60. The saw chain comprises a plurality of center drive link plates 62, and a plurality of side link plates 64. Interspersed with the drive link plates are a plurality of left cutter links, such as the one shown at 66, and a plurality of right cutter links (not shown). Pairs of side link plates 64 are employed to connect alternate pairs of drive link plates 62, and other alternate pairs of center drive link plates are connected together by one side link plate and one of the cutter links, either the left or the right cutter link. The right and left cutter links are allochiral, and are alternately positioned on opposite sides of the saw chain. All of the various links are connected together at their ends by means of rivets 69 extending through apertures 71 in the various link plates and links.

One of the cutter links, namely, the left cutter link, is shown removed from the saw chain in FIGS. 8, 9 and 10. This link, which is connected mechanically to the remainder of the saw chain, which remainder constitutes saw body structure comprising a metal mounting portion 72, and a one-piece body of integrated ceramic composition, shown at 74.

The cutter link adjacent the front thereof includes a depth gauge portion 76 which is an integral part of metal mounting portion 72. Cutter edges are provided in ceramic body 74 and these include edges 78, 80. In mounting ceramic body 74 on portion 72, a channel 82 extending along one side of the body fits over a tongue 84 of mounting portion 72. The base of the ceramic body, through depending portions 86, 88, rests on shoulder portions 90, 92 of mounting portion 72.

Ceramic body 74 may be bonded to the metal mounting portion using the procedures earlier described. During this bonding, the entire saw chain need not be subjected to the elevated temperatures and special environmental conditions discussed, as the cutter link may first be completed by joining the ceramic body and metal mounting portion, and then be attached to the saw chain through the rivets described.

It should be apparent from the above that the invention features a number of novel concepts. For one thing, saw structure is contemplated which is extremely durable, and substantially more resistant to dulling of its cutting edges than previous types of saws. The ceramic bodies which have the cutting edges in the saw are first joined to a metal mounting, and it is this metal mounting which is secured to the body structure of the saw to complete the saw. This metal mounting may be attached to the saw blade by soldering techniques at temperatures lower than the temperatures employed to produce the bond between the ceramic body and the metal mounting.

While there has been described various modifications of the invention, it should be apparent that variations are possible without departing from the invention. It is desired to cover all such organizations as would be apparent to one skilled in the art, and that come within the scope of the appended claims.

It is claimed and desired to secure by Letters Patent:

1. In a saw,
   a metallic saw blade, and a tooth adjacent an edge of the saw,
   said tooth comprising a metallic heel portion forming an integral part of the saw blade, and a one-piece body of integrated ceramic composition supported on said heel portion,
   said ceramic body having a cutter edge extending along a margin thereof, functioning as the cutting edge in the tooth of the saw,
   said tooth further comprising a metal mounting interposed between said ceramic body and heel portion, means bonding the ceramic body and mounting together, and means bonding the mounting and heel portion together.

2. In a saw,
   a metallic saw blade, and a tooth adjacent an edge of the saw,
   said tooth comprising a metallic heel portion forming an integral part of the saw blade,
   said heel portion having a cavity defining edge that defines a cavity recessed rearwardly thereinto from a forward margin of the heel portion,
   a one-piece body of integrated ceramic composition, said body including an anchoring portion fitted within said recess, and at least one cutter edge extending along a margin of the body functioning as a cutting edge for the saw tooth, a metallic mounting interposed between said anchoring portion of the ceramic body and said recess, having a concave side receiving said anchoring portion where it fits within said recess and a convex side facing said cavity defining edge, means bonding the concave side of hte mounting to the ceramic body, and means bonding the convex side of the mounting to said cavity defining edge.

References Cited

UNITED STATES PATENTS

| | | |
|---|---|---|
| 2,102,305 | 12/1937 | Chormann et al. |
| 2,251,007 | 7/1941 | Schröter. |
| 2,979,414 | 4/1961 | Ryshkewitch et al. __ 29—95.5 X |

FOREIGN PATENTS

| | | |
|---|---|---|
| 347,173 | 4/1931 | Great Britain. |

DONALD R. SCHRAN, Primary Examiner

U.S. Cl. X.R.

29—95; 143—135